United States Patent
Hu

(10) Patent No.: US 7,490,159 B2
(45) Date of Patent: Feb. 10, 2009

(54) METHODS AND SYSTEMS FOR DYNAMIC INFORMATION TRANSMISSION

(75) Inventor: Chih-Lin Hu, Tainan (TW)

(73) Assignee: Qisda Corporation, Taoyuan County (TW)

( * ) Notice: Subject to any disclaimer, the term of this patent is extended or adjusted under 35 U.S.C. 154(b) by 543 days.

(21) Appl. No.: 11/354,742

(22) Filed: Feb. 14, 2006

(65) Prior Publication Data

US 2006/0184691 A1    Aug. 17, 2006

(30) Foreign Application Priority Data

Feb. 15, 2005    (TW) .............................. 94104299 A

(51) Int. Cl.
  *G06F 15/173*    (2006.01)
(52) U.S. Cl. ..................................................... 709/235
(58) Field of Classification Search ................. 709/235, 709/223, 230

See application file for complete search history.

(56) References Cited

U.S. PATENT DOCUMENTS

| 5,613,196 | A  | * | 3/1997  | Barnes et al. .................. 455/15 |
| 5,815,799 | A  | * | 9/1998  | Barnes et al. .................. 455/15 |
| 5,901,341 | A  | * | 5/1999  | Moon et al. ..................... 455/9 |
| 6,130,924 | A  | * | 10/2000 | Rosenzweig et al. ........ 375/350 |
| 6,278,717 | B1 | * | 8/2001  | Arsenault et al. ............ 370/477 |
| 6,415,133 | B1 | * | 7/2002  | Brede et al. ................. 455/3.05 |
| 6,434,583 | B1 | * | 8/2002  | Dapper et al. ............... 708/409 |
| 6,467,092 | B1 | * | 10/2002 | Geile et al. .................. 725/131 |
| 6,704,295 | B1 | * | 3/2004  | Tari et al. ..................... 370/270 |
| 6,726,152 | B2 | * | 4/2004  | Higgins .................... 244/158.4 |
| 6,788,702 | B1 | * | 9/2004  | Garcia-Luna-Aceves et al. .......................... 370/458 |
| 7,103,029 | B1 | * | 9/2006  | Minowa ..................... 370/342 |

\* cited by examiner

*Primary Examiner*—David Y Eng

(57) ABSTRACT

Methods for dynamic information transmission. Data objects having the highest broadcast positions respectively in the data object sequences are acquired as multiple candidate data objects. A measure for each candidate data object is calculated using a GMF (gain measure function). One candidate data object is pushed in an output queue contingent upon the measures thereof, enabling the pushed candidate data object to be transmitted before the other candidate data objects to a client apparatus via the output queue.

19 Claims, 6 Drawing Sheets

METHODS AND SYSTEMS FOR DYNAMIC INFORMATION TRANSMISSION

BACKGROUND

The invention relates to information transmission, and more particularly, to methods and systems for dynamic information transmission.

Many emerging data-intensive applications, such as those for electronic auction, news distribution, proxy service, and Web surfing, involve numbers of servers and much larger numbers of clients. The traditional pull-based or client-server data dissemination model, however, often suffers from scalability problems and performance degradation, especially when information flow or bandwidth capacity is asymmetric. In contrast, a push-based data broadcast model is scaled up to client population. The central idea of data broadcasting is that the server periodically broadcasts data objects to many clients who monitor the broadcast channel and retrieve data objects without explicit requests.

Although substantial applications have adopted data broadcast methodologies, they are mainly based on traditional data management systems, where a data object is mapped to state and value in the database. In such environments, a data object is independent, persistent, and static against a simple query/transaction. A simple query or read transaction is processed successfully, when a client retrieves the respondent data object on the broadcast channel. Many modern applications in practice, however, spread dynamic data objects and answer complex queries for retrieving multiple data objects. In dynamic environments, data streams need to be processed online rather than stored and later retrieved to answer queries. Dynamic data objects may have relationships, e.g., an anchor relationship among web pages or referential integrity constraint for the relations in a relational database. Hence, data objects can be associated, dependent, and dynamically generated.

SUMMARY

Methods for dynamic information transmission, executed by a processing unit, are provided. An embodiment of a method arranges multiple data object sequences respectively for multiple information service providers to an output queue, each data object sequence comprising multiple sequentially aligned data objects. The data objects having the highest broadcast positions respectively in the data object sequences are acquired as multiple candidate data objects. A measure for each candidate data object is calculated using a GMF (gain measure function). One candidate data object is pushed in an output queue contingent upon the measures thereof, enabling the pushed candidate data object to be transmitted before the other candidate data objects to a client apparatus via the output queue.

A machine-readable storage medium storing a computer program which, when executed, performs the method of dynamic information transmission is also provided.

Systems for dynamic information transmission are further provided. An embodiment of a dynamic information transmission system comprising an input queue and a processing unit arranges multiple data object sequences respectively for multiple information service providers to an output queue, each data object sequence comprising multiple sequentially aligned data objects. The processing unit, coupled to the input queue, acquires the data objects having the highest broadcast positions respectively in the data object sequences as multiple candidate data objects, calculates a measure for each candidate data object using a GMF, and pushes one candidate data object in the output queue contingent upon the measures thereof, enabling the pushed candidate data object to be transmitted before the other candidate data objects to a client apparatus via the output queue.

A GMF may be:

$$G(d_i^k) = -q_k \cdot n_k,$$

where $d_i^k$ represents one candidate data object being the i-th data object generated by the corresponding information provider $S_k$, $q_k$ represents a weighted value indicating the subscribed extent of $S_k$, and $n_k$ represents the number of data objects generated by $S_k$ in a constant time interval.

A GMF may be:

$$G(d_i^k) = q_k \cdot L - q_k \cdot (dd_{i+1,i+2}^k + \ldots + dd_{n_k,1}^k + \ldots + dd_{i-1,i}^k),$$

where $d_i^k$ represents one candidate data object being the i-th data object generated by the corresponding information provider $S_k$, $q_k$ represents a weighted value indicating the subscribed extent of $S_k$, L represents the number of time slots allocated in the output queue, $dd_{i+1,i+2}^k$ represents a directed distance between $d_{i+1}^k$ and $d_{i+2}^k$, $dd_{n_k,1}^k$ represents a directed distance between $d_{n_k}^k$ and $d_1^k$, and $dd_{i-1,i}^k$ represents a directed distance between $d_{i-1}^k$ and $d_i^k$.

A GMF may be:

$$G(d_i^k) = q_k \cdot \frac{\left(\frac{L}{n_k} - dd_{i-1,i}^k\right)^2}{\left(\frac{L}{n_k}\right)^2},$$

where $d_i^k$ represents one candidate data object being the i-th data object generated by the corresponding information provider $S_k$, $q_k$ represents a weighted value indicating the subscribed extent of $S_k$, L represents the number of time slots allocated in the output queue, $n_k$ represents the number of data objects generated by $S_k$ in a constant time interval, and $dd_{i-1,i}^k$ represents a directed distance between $d_{i-1}^k$ and $d_i^k$.

A GMF may be:

$$G(d_i^k) = q_k \cdot \frac{\left(\frac{L}{n_k} - dd_{i-1,i}^k\right)^2}{\left(\frac{L}{n_k}\right)^2} \cdot \sum_{1 \le i \le n_k - 1} \left(dd_{i,i+1}^k - \left(2\frac{L}{n_k} - dd_{i-1,i}^k\right)\right),$$

where $d_i^k$ represents one candidate data object being the i-th data object generated by the corresponding information provider $S_k$, L represents the number of time slots allocated in the output queue, $n_k$ represents the number of data objects generated by $S_k$ in a constant time interval, $dd_{i,i+1}^k$ represents a directed distance between $d_i^k$ and $d_{i+1}^k$, and $dd_{i-1,i}^k$ represents a directed distance between $d_{i-1}^k$ and $d_i^k$.

BRIEF DESCRIPTION OF THE DRAWINGS

The invention can be more fully understood by referring to the following detailed description of embodiments with reference to the accompanying drawings, wherein.

DESCRIPTION

Figure 1:
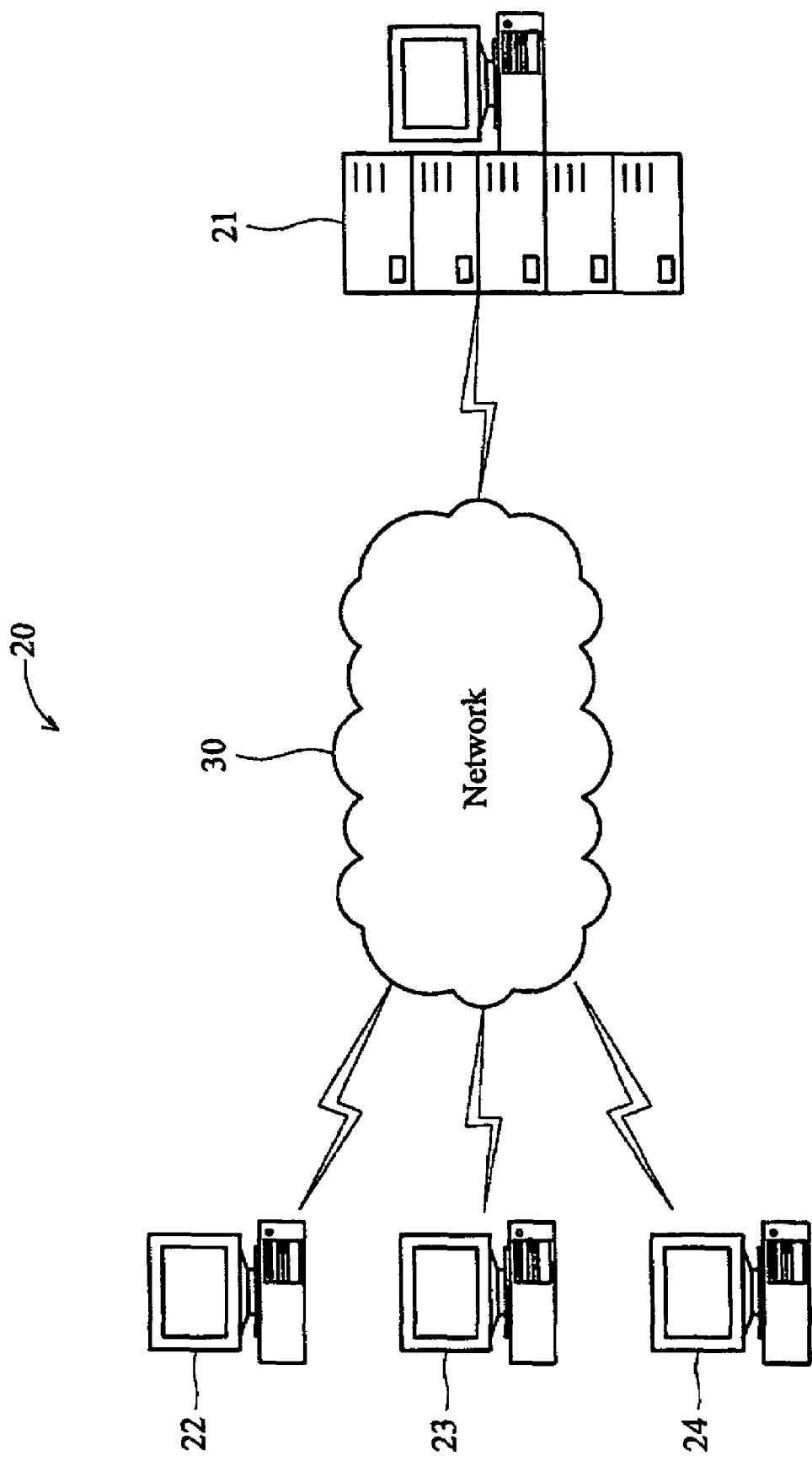
FIG. 1 is a diagram of the network architecture of an embodiment of an information transmission system.

FIG. 1 is a diagram of the network architecture of an embodiment of an information transmission system 20, comprising a broadcast server 21, client apparatuses 22, 23 and 24, operating in a network (preferably Internet or intranet) using logical connections therebetween. Those skilled in the art will recognize that the broadcast server 21, client apparatuses 22, 23 and 24 may be connected in different types of networking environments, and communicate between different types of networking environments through various types of transmission devices such as routers, gateways, access points, base station systems or others.

Figure 2:
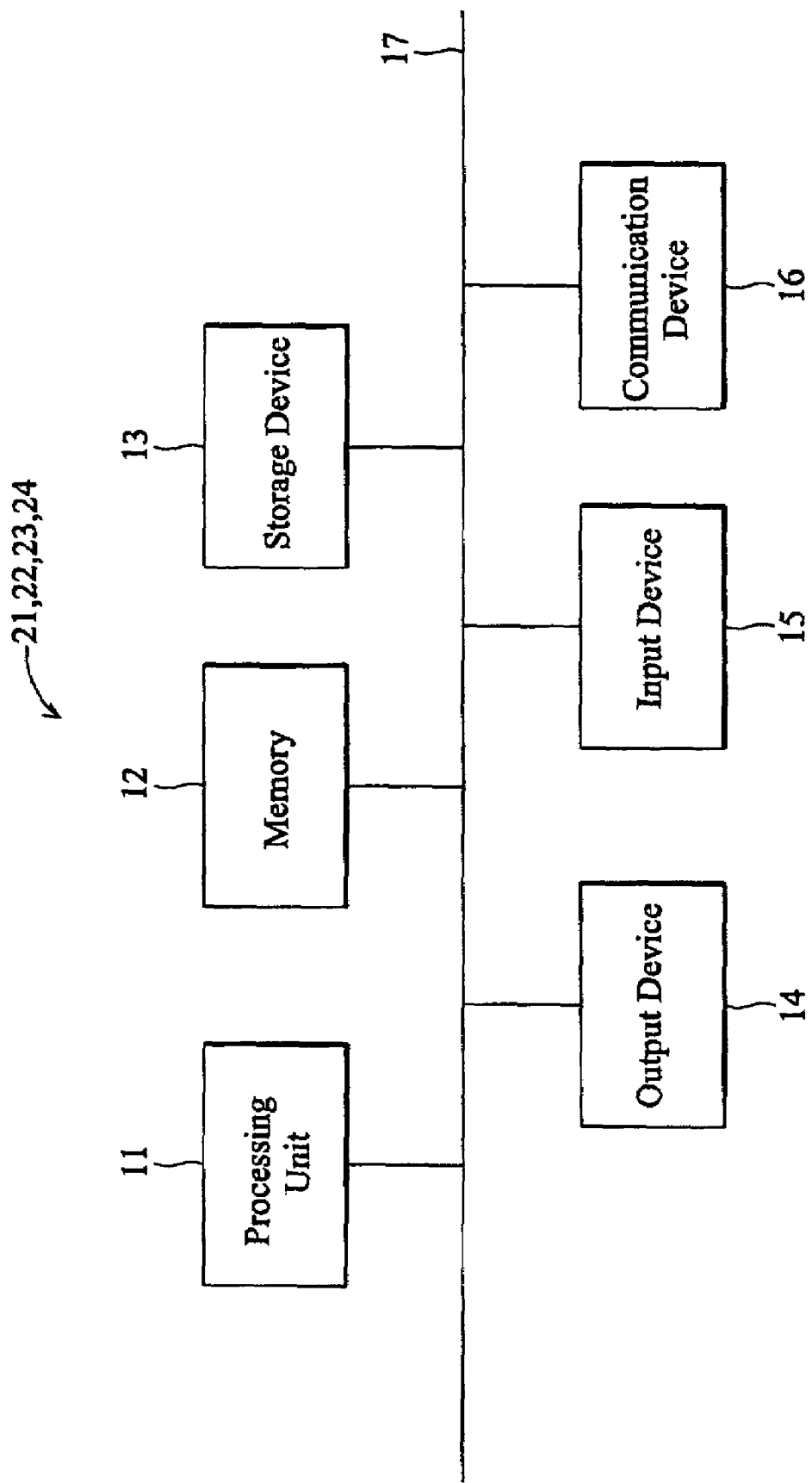
FIG. 2 is a diagram of a hardware environment applicable to a broadcast server.

FIG. 2 is a diagram of a hardware environment applicable to broadcast server 21, client apparatuses 22, 23 and 24 in an embodiment of an information transmission system, comprising a processing unit 11, a memory 12, a storage device 13, an input device 14, an output device 15 and a communication device 16. The processing unit 11 is connected by buses 17 to the memory 12, storage device 13, input device 14, output device 15 and communication device 16 based on Von Neumann architecture. There may be one or more processing units 11, such that the processor of the computer comprises a single central processing unit (CPU), a microprocessing unit (MPU) or multiple processing units, commonly referred to as a parallel processing environment. The memory 12 is preferably a random access memory (RAM), but may also include read-only memory (ROM) or flash ROM. The memory 12 preferably stores program modules executed by the processing unit 11 to perform information transmission functions. Generally, program modules include routines, programs, objects, components, scripts, Web pages, or others, that perform particular tasks or implement particular abstract data types. Moreover, those skilled in the art will understand that some embodiments may be practiced with other computer system configurations, including hand-held devices, multiprocessor-based, microprocessor-based or programmable consumer electronics, network PCs, minicomputers, mainframe computers, and the like. Some embodiments of the broadcast server 21 may also be practiced in distributed computing environments where tasks are performed by remote processing devices linked through a communication network. In a distributed computing environment, program modules may be located in both local and remote memory storage devices based on various remote access architecture such as DCOM, CORBA, Web objects, Web Services or other similar architectures. The storage device 13 may be a hard drive, magnetic drive, optical drive, portable drive, or nonvolatile memory drive. The drives and associated computer-readable media thereof (if required) provide nonvolatile storage of computer-readable instructions, data structures and program modules. The processing unit 11, controlled by program modules received from the memory 12 and from an operator through the input device, directs information transmission functions.

Figure 3:
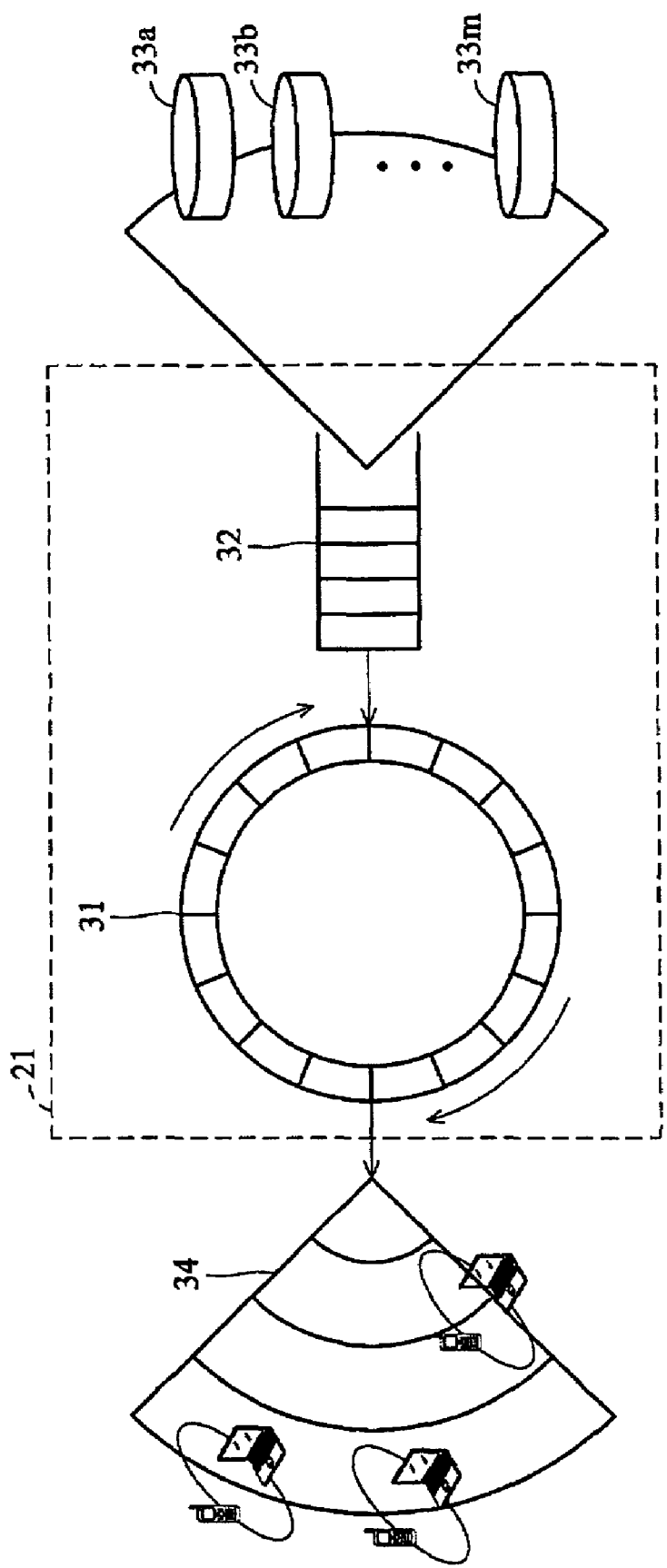
FIG. 3 is a schematic diagram for exemplary information transmission.

FIG. 3 is a schematic diagram of exemplary information transmission. Data objects are produced dynamically by information providers 33a, 33b to 33m, disseminated efficiently by the broadcast server 21, and associated sequentially in the client apparatuses. The data objects may be digital music, video streams, graphs, files, Web pages, database record or others. While data objects are scheduled on the broadcast channel, a number of objects generated by the same information provider are viewed to be sequentially associated. The measure of service access time is the time interval from the moment at which a client apparatus requests a service to the moment when all objects from the service in the broadcast cycle are completely downloaded. The broadcast server 21 utilizes an online scheduling mechanism based on periodicity to optimize the broadcast schedule and minimize the mean service access time in an infinite time horizon.

Figure 4:
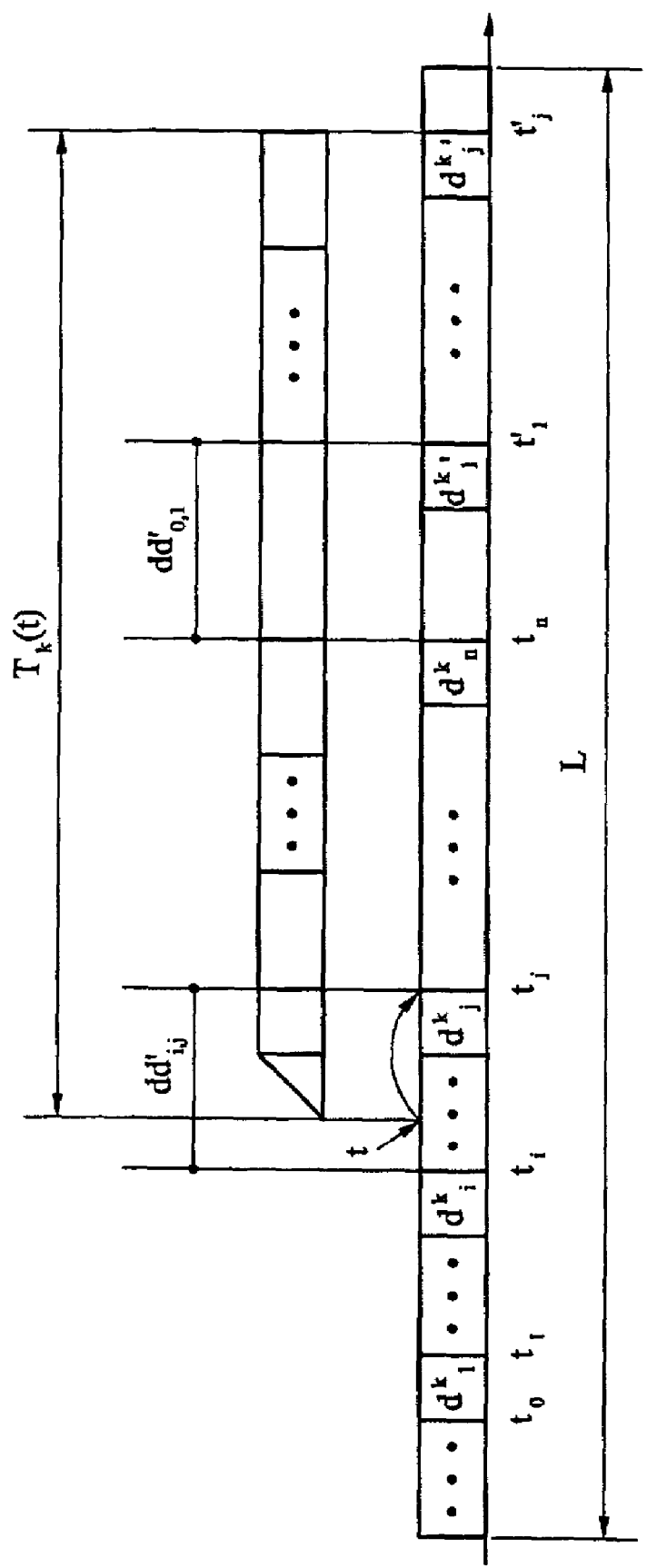
FIG. 4 is a diagram illustrating an exemplary broadcast schedule.

FIG. 4 is a diagram illustrating an exemplary broadcast schedule. S denotes the collection of m information providers $S_1, S_2$ to $S_m$. Each information server has an object production rate $O_k$ that produces $n_k$ fixed-length objects in a constant time interval I. The broadcast server 21 thus has $N=n_1+n_2+\ldots+n_m=\Sigma_{1\leq k\leq m}nk$ objects per I. Assuming that a slotted time model is employed, it takes one time slot to broadcast each object. The length of a broadcast cycle, denoted as L, is equal to the number of time slots used to deliver objects by a periodic broadcast schedule, denoted as $P_i$. An infinite schedule P in the time horizon is an orderly union of flat broadcast programs $\cup_{i=1}^{\infty} P_i$ where $P_i$ is a sequence of N dynamic sequential objects generated by m information providers in the i-th time interval I. Specifically, $P_i$ is a sequence of $d_1, \ldots, d_i, \ldots d_j, \ldots d_N$ where $d_i \neq d_j$ for $i \neq j$ and $1 \leq i,j \leq N$. Thus, L=I=N. For convenience, an object $d_i$ in P is $d_i^k$ when $d_i \in S_k$ and defines the object production order of an information server $S_k$ as $o_k=<d_1^k, d_2^k, \ldots, d_{nk}^k>$ in an interval of N consecutive time slots. The service access time, denoted as $T_k(t)$, is the time duration from the moment at which a client requests $S_k$ to the instant when $n_k$ consecutive objects by $S_k$ in P are completely downloaded. Given two objects $d_i^k$ and $d_j^k$ generated by $S_k$ and $0 \leq i \leq j \leq n_k$, $P(d_i^k)$ and $P(d_j^k)$ represent the respective slot positions of $d_i^k$ and $d_j^k$ in P within a cycle L. Both $d_i^k$ and $d_j^k$ are at a directed distance, denoted as $dd_{i,j}^k=(P(d_i^k)-P(d_j^k))$ mod L.

Figure 5:
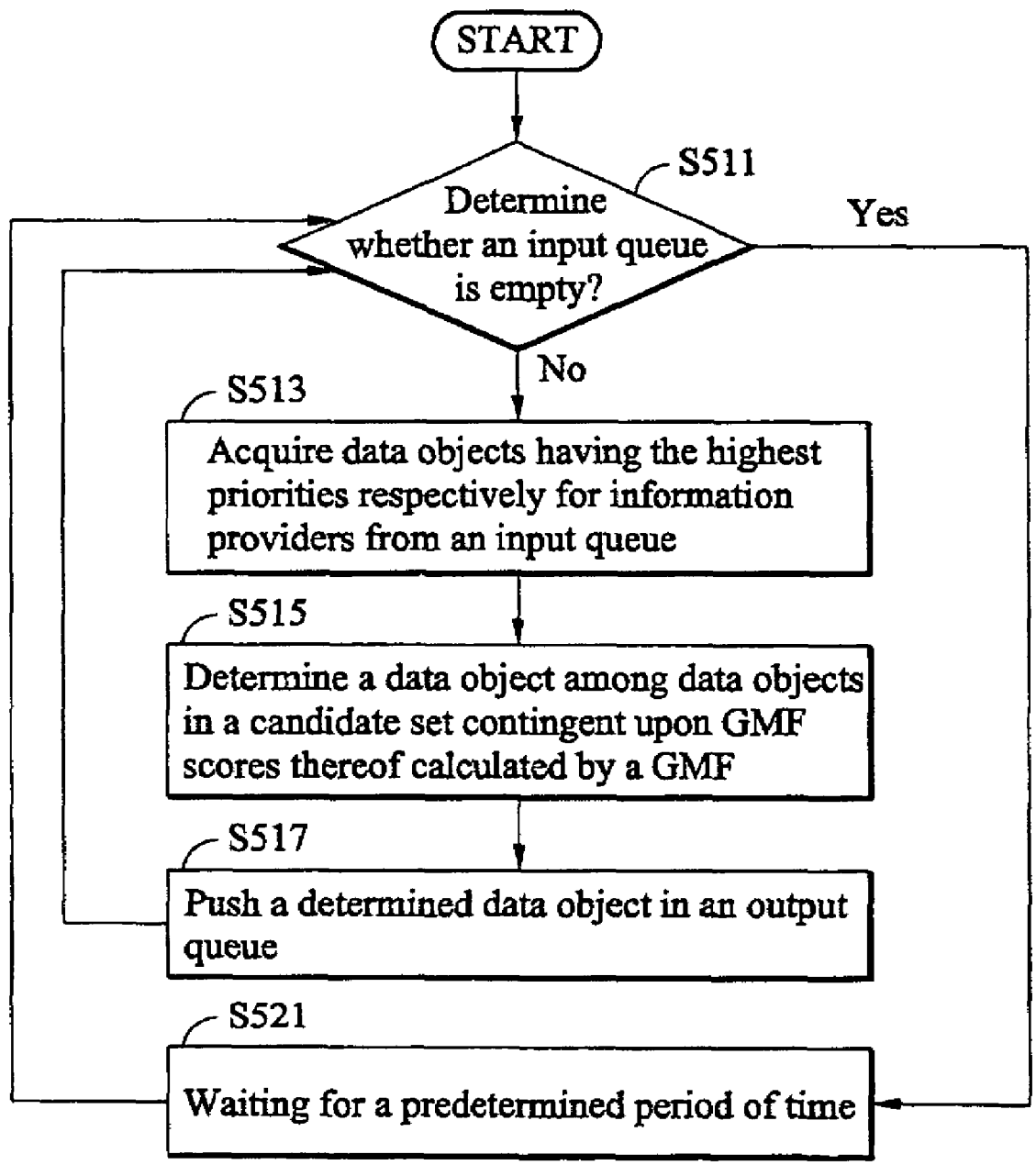
FIG. 5 is a flowchart of an embodiment of a method for dynamic information transmission.

With respect to dynamic information dissemination, the primary principle of dynamic information transmission method is to arrange dynamic sequential objects from the same information server as densely as possible in an infinite and periodic schedule, enabling the broadcast server 21 to determine the next data object pushed in the output queue 31. FIG. 5 is a flowchart of an embodiment of a method for dynamic information transmission, performed by the processing unit 11 in the broadcast server 21. In step S511, it is determined whether the input queue 32 is empty, and, if so, the process proceeds to step S521, and, otherwise, to step S513. In step S521, a predetermined period of time passes. In step S513, data objects having the highest priorities respectively for information providers $S_1, S_2$ to $S_m$, are acquired from the input queue 32, and stored in a candidate set. In step S515, GMF (Gain Measure Function, GMF) scores for data objects in the candidate set are calculated using a GMF, and a data object having the largest GMF score is determined to be pushed in the output queue 31, yielding improved broadcast efficiency (i.e. smaller service access time). In step S517, the determined data object is pushed in the output queue 31. A broadcast processing unit (not shown) transmits data objects in the output queue 31 to relevant client apparatuses based on a FIFO (First-In-First-Out) basis.

The GMF scores can be calculated by one of the following formulae.

Formula (1):

$$G_1(d_i^k) = -q_k \cdot n_k,$$

where $d_i^k$ represents the i-th data object generated by $S_k$ in the candidate set, $q_k$ represents a weighted value indicating the subscribed extent of $S_k$, and $n_k$ represents the number of fixed-length data objects generated by $S_k$ in a constant time interval. To reduce average service access time, the equation (1) defers those data objects from any $S_k$ with a relatively large $n_k$, as long as possible, to the end of the output queue 31. The data object sequence corresponding to the determined data object determined by equation (1) has the lowest number of data objects.

Formula (2):

$$G_2(d_i^k) = q_k \cdot L - q_k \cdot (dd_{i+1,i+2}^k + \ldots + dd_{n_k,1}^k + \ldots + dd_{i-1,i}^k),$$

where $d_i^k$ represents the i-th data object generated by $S_k$ in the candidate set, $q_k$ represents a weighted value indicating the subscribed extent of $S_k$, L represents the number of time slots allocated in the output queue 31, $dd_{i+1,i+2}^k$ represents a directed distance between $d_{i+1}^k$ and $d_{i+2}^k$, $dd_{n_k,1}^k$ represents a directed distance between $d_{n_k}^k$ and $d_1^k$, and $dd_{i-1,i}^k$ represents a directed distance between $d_{i-1}^k$ and $d_i^k$. With a definitive L, a larger remainder indicates that the slot positions of the successive $n_k-1$ data objects $<d_{i+2}^k, \ldots, d_{n_k}^k, d_1^k, \ldots, d_i^k>$ are closer.

Formula (3):

$$G_3(d_i^k) = q_k \cdot \frac{\left(\frac{L}{n_k} - dd_{i-1,i}^k\right)^2}{\left(\frac{L}{n_k}\right)^2},$$

where $d_i^k$ represents the i-th data object generated by $S_k$ in the candidate set, $q_k$ represents a weighted value indicating the subscribed extent of $S_k$, L represents the number of time slots allocated in the output queue 31, $n_k$ represents the number of fixed-length data objects generated by $S_k$ in a constant time interval, and $dd_{i-1,i}^k$ represents a directed distance between $d_{i-1}^k$, and $d_i^k$. In equation (3), only a single data object of each $S_k$ is concerned, irrespective of previously broadcasted data objects.

Formula (4):

$$G_4(d_i^k) = G_3(d_i^k) \cdot \sum_{1 \leq i \leq n_k - 1} \left(dd_{i,i+1}^k - \left(2\frac{L}{n_k} - dd_{i-1,i}^k\right)\right),$$

where $d_i^k$ represents the i-th data object generated by $S_k$ in the candidate set, L represents the number of time slots allocated in the output queue 31, $n_k$ represents the number of fixed-length data objects generated by $S_k$ in a constant time interval, $dd_{i,i+1}^k$ represents a directed distance between $d_{i-1}^k$ and $d_{i+1}^k$, and $dd_{i-1,i}^k$ represents a directed distance between $d_{i-1}^k$ and $d_i^k$. In contrast to Equation (3), Equation (4) calculates $G_4(d_i^k)$ of each $n_k-1$ data object in the candidate set by reverse accumulation of possible benefits from the previous data objects in sequence of $o_k$ and the next object $d_{i+1}^k$. Equations (2), (3) and (4) calculate the GMF scores by considering directed distances between the data objects in the corresponding data object sequences for all candidate data objects.

Figure 6:
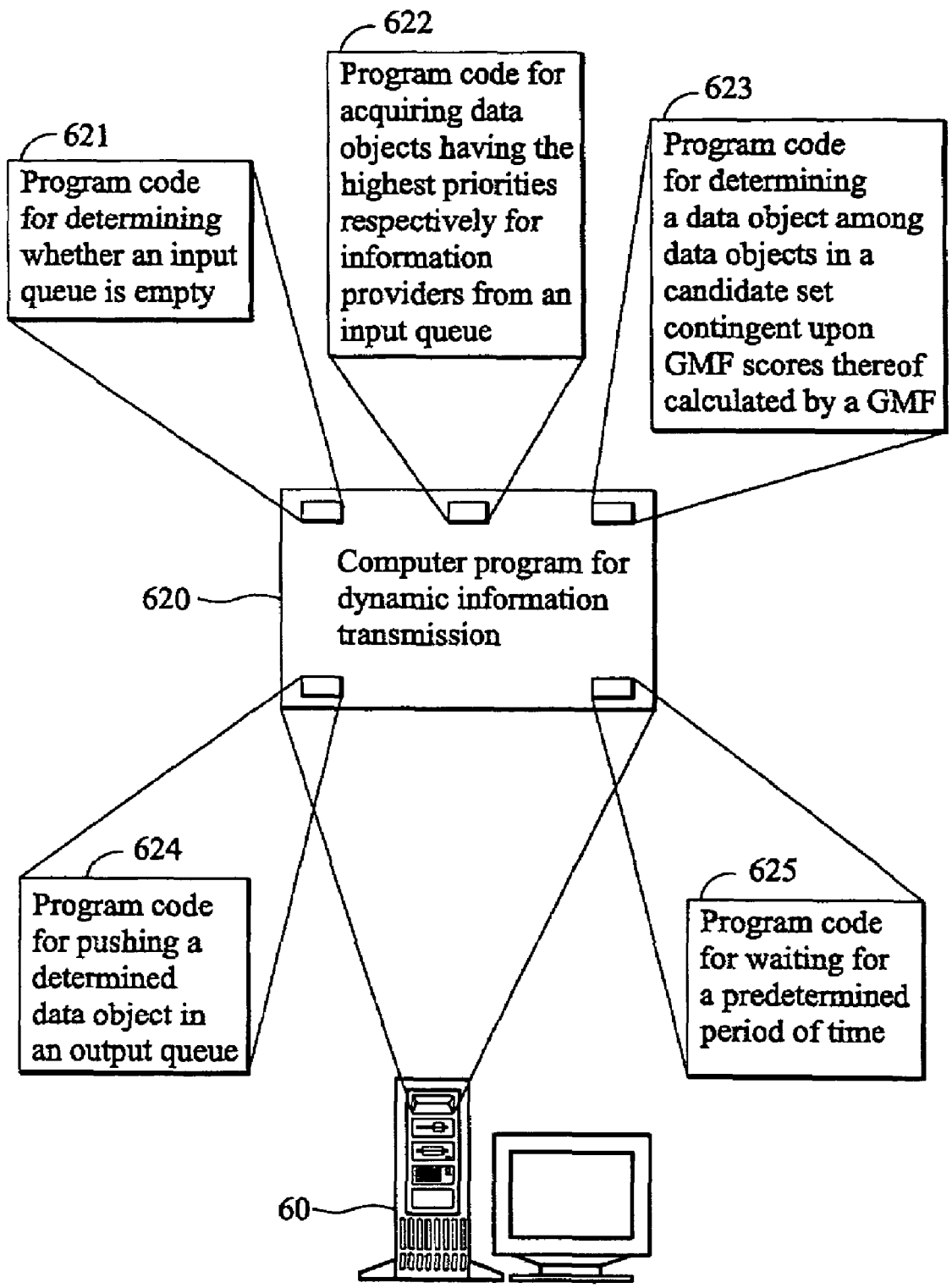
FIG. 6 is a diagram of a storage medium storing a computer program providing an embodiment of a method for dynamic information transmission.

Also disclosed is a storage medium as shown in FIG. 6 storing a computer program 620 providing the disclosed method of dynamic information transmission. The computer program product includes a storage medium 60 having computer readable program code embodied therein for use in a computer system. The computer readable program code comprises at least computer readable program code 621 determining whether an input queue is empty, computer readable program code 622 acquiring data objects having the highest priorities respectively for information providers from an input queue, then stored in a candidate set if an input queue is not empty, computer readable program code 623 determining a data object among data objects in a candidate set contingent upon GMF scores thereof calculated by a GMF, computer readable program code 624 pushing the determined data object in an output queue, and computer readable program code 625 waiting for a predetermined period of time.

Dynamic information transmission systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The disclosed methods and systems may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described in terms of preferred embodiment, it is not limited thereto. Those skilled in the technology can make various alterations and modifications without departing from the scope and spirit of the invention. Therefore, the scope of the invention shall be defined and protected by the following claims and their equivalents.

What is claimed is:

1. A method for dynamic information transmission, executed by a processing unit, arranging a plurality of data object sequences respectively for a plurality of information service providers to an output queue, each data object sequence comprising a plurality of sequentially aligned data objects, the method comprising:
   acquiring the data objects having the highest broadcast positions respectively in the data object sequences as a plurality of candidate data objects;
   calculating a measure for each candidate data object using a GMF (gain measure function); and
   pushing one candidate data object in the output queue contingent upon the measures thereof,
   enabling the pushed candidate data object to be transmitted before the other candidate data objects to a client apparatus via the output queue.

2. The method of claim 1 wherein the pushed candidate data object has a greater measure than that of the other candidate data object.

3. The method of claim 1 wherein the GMF is utilized to arrange the data objects generated by the same information provider as densely as possible.

4. The method of claim 1 wherein the data object sequence corresponding to the pushed candidate data object has the lowest number of data objects.

5. The method of claim 4 wherein the GMF is:

$$G(d_i^k) = -q_k \cdot n_k,$$

$d_i^k$ representing one candidate data object being the i-th data object generated by the corresponding information provider $S_k$, $q_k$ representing a weighted value indicating the subscribed extent of $S_k$, and $n_k$ representing the number of data objects generated by $S_k$ in a constant time interval.

6. The method of claim 1 wherein the GMF calculates the GMF scores by considering directed distances between the data objects in the corresponding data object sequences for the candidate data objects.

7. The method of claim 6 wherein the GMF is:

$$G(d_i^k) = q_k \cdot L - q_k \cdot (dd_{i+1,i+2}^k + \ldots + dd_{nk,1}^k + \ldots + dd_{i-1,i}^k),$$

$d_i^k$ representing one candidate data object being the i-th data object generated by the corresponding information provider $S_k$, $q_k$ representing a weighted value indicating the subscribed extent of $S_k$, L representing the number of time slots allocated in the output queue, $dd_{i+1,i+2}^k$ representing a directed distance between $d_{i+1}^k$ and $d_{i+2}^k$, $dd_{nk,1}^k$ representing a directed distance between $d_{nk}^k$ and $d_1^k$, and $dd_{i-1,i}^k$ representing a directed distance between $d_{i-1}^k$, and $d_i^k$.

8. The method of claim 6 wherein the GMF is:

$$G(d_i^k) = q_k \cdot \frac{\left(\frac{L}{n_k} - dd_{i-1,i}^k\right)^2}{\left(\frac{L}{n_k}\right)^2},$$

$d_i^k$ representing one candidate data object being the i-th data object generated by the corresponding information provider $S_k$, $q_k$ representing a weighted value indicating the subscribed extent of $S_k$, L representing the number of time slots allocated in the output queue, $n_k$ representing the number of data objects generated by $S_k$ in a constant time interval, and $dd_{i-1,i}^k$ representing a directed distance between $d_{i-1}^k$ and $d_i^k$.

9. The method of claim 6 wherein the GMF is:

$$G(d_i^k) = q_k \cdot \frac{\left(\frac{L}{n_k} - dd_{i-1,i}^k\right)^2}{\left(\frac{L}{n_k}\right)^2} \cdot \sum_{1 \le i \le n_k - 1} \left(dd_{i,i+1}^k - \left(2\frac{L}{n_k} - dd_{i-1,i}^k\right)\right),$$

$d_i^k$ representing one candidate data object being the i-th data object generated by the corresponding information provider $S_k$, L representing the number of time slots allocated in the output queue, $n_k$ representing the number of data objects generated by $S_k$ in a constant time interval, $dd_{i,i+1}^k$ representing a directed distance between $d_i^k$ and $d_{i+1}^k$, and $dd_{i-1,i}^k$, representing a directed distance between $d_{i-1}^k$ and $d_i^k$.

10. A machine-readable storage medium storing a computer program which, when executed, performs a method for dynamic information transmission, the method arranging a plurality of data object sequences respectively for a plurality of information service providers to an output queue, each data object sequence comprising a plurality of sequentially aligned data objects, the method comprising:

acquiring the data objects having the highest broadcast positions respectively in the data object sequences as a plurality of candidate data objects;

calculating a measure for each candidate data object using a GMF (gain measure function); and pushing one candidate data object in the output queue contingent upon the measures thereof, enabling the pushed candidate data object to be transmitted before the other candidate data objects to a client apparatus via the output queue.

11. A system for dynamic information transmission, capable of arranging a plurality of data object sequences respectively for a plurality of information service providers to an output queue, each data object sequence comprising a plurality of sequentially aligned data objects, the system comprising:

an input queue;

a processing unit coupling to the input queue, acquiring the data objects having the highest broadcast positions respectively in the data object sequences as a plurality of candidate data objects, calculating a measure for each candidate data object using a GMF (gain measure function), pushing one candidate data object in the output queue contingent upon the measures thereof, enabling the pushed candidate data object to be transmitted before the other candidate data objects to a client apparatus via the output queue.

12. The system of claim 11 wherein the pushed candidate data object has a greater measure than that of the other candidate data object.

13. The system of claim 11 wherein the GMF is utilized to arrange the data objects generated by the same information provider as densely as possible.

14. The system of claim 11 wherein the data object sequence corresponding to the pushed candidate data object has the lowest number of data objects.

15. The system of claim 14 wherein the GMF is:

$$G(d_i^k) = -q_k \cdot n_k,$$

$d_i^k$ representing one candidate data object being the i-th data object generated by the corresponding information provider $S_k$, $q_k$ representing a weighted value indicating the subscribed extent of $S_k$, and $n_k$ representing the number of data objects generated by $S_k$ in a constant time interval.

16. The system of claim 1 wherein the GMF calculates the GMF scores by considering directed distances between the data objects in the corresponding data object sequences for the candidate data objects.

17. The system of claim 16 wherein the GMF is:

$$G(d_i^k) = q_k \cdot L - q_k \cdot (dd_{i+1,i+2}^k + \ldots + dd_{nk,1}^k + \ldots + dd_{i-1,i}^k),$$

$d_i^k$ representing one candidate data object being the i-th data object generated by the corresponding information provider $S_k$, $q_k$ representing a weighted value indicating the subscribed extent of $S_k$, L representing the number of time slots allocated in the output queue, $dd_{i+1,i+2}^k$ representing a directed distance between $d_{i+1}^k$ and $d_{i+2}^k$, $dd_{nk,1}^k$ representing a directed distance between $d_{nk}^k$ and $d_1^k$, and $dd_{i-1,i}^k$ representing a directed distance between $d_{i-1}^k$ and $d_i^k$.

18. The system of claim 16 wherein the GMF is:

$$G(d_i^k) = q_k \cdot \frac{\left(\frac{L}{n_k} - dd_{i-1,i}^k\right)^2}{\left(\frac{L}{n_k}\right)^2},$$

$d_i^k$ representing one candidate data object being the i-th data object generated by the corresponding information provider $S_k$, $q_k$ representing a weighted value indicating the subscribed extent of $S_k$, L representing the number of time slots allocated in the output queue, $n_k$ representing the number of data objects generated by $S_k$ in a constant time interval, and $dd_{i-1,i}^k$ representing a directed distance between $d_{i-1}^k$ and $d_i^k$.

19. The system of claim 16 wherein the GMF is:

$$G(d_i^k) = q_k \cdot \frac{\left(\frac{L}{n_k} - dd_{i-1,i}^k\right)^2}{\left(\frac{L}{n_k}\right)^2} \cdot \sum_{1 \le i \le n_k - 1} \left(dd_{i,i+1}^k - \left(2\frac{L}{n_k} - dd_{i-1,i}^k\right)\right),$$

$d_i^k$ representing one candidate data object being the i-th data object generated by the corresponding information provider $S_k$, L representing the number of time slots allocated in the output queue, $n_k$ representing the number of data objects generated by $S_k$ in a constant time interval, $dd_{i,i+1}^k$ representing a directed distance between $d_i^k$ and $d_{i+1}^k$, and $dd_{i-1,i}^k$ representing a directed distance between $d_{i-1}^k$ and $d_i^k$.

* * * * *